United States Patent
Pan et al.

(10) Patent No.: US 7,212,479 B2
(45) Date of Patent: May 1, 2007

(54) APPARATUS AND METHOD OF DETECTING DEFECTS ON OPTICAL RECORDING MEDIA

(75) Inventors: Jyh-Shin Pan, Hsin Chu Hsien (TW); Chih-Yuan Chen, Chang Hua Hsien (TW)

(73) Assignee: Mediatek Inc., Hsin-Chu City (TW)

( * ) Notice: Subject to any disclaimer, the term of this patent is extended or adjusted under 35 U.S.C. 154(b) by 695 days.

(21) Appl. No.: 10/336,017

(22) Filed: Jan. 3, 2003

(65) Prior Publication Data

US 2004/0047258 A1 Mar. 11, 2004

(30) Foreign Application Priority Data

Sep. 10, 2002 (TW) .............................. 91120597 A (51) Int. Cl.
*G11B 7/00* (2006.01)
*G11B 5/09* (2006.01)
(52) U.S. Cl. ................... 369/53.15; 369/47.14
(58) Field of Classification Search ............. 369/53.15, 369/47.15, 47.32, 47.34, 47.18, 53.24, 53.32, 369/59.26, 59.14, 30.07, 47.1, 53.1, 53.37, 369/15, 53.22, 53.23, 53.17, 47.14
See application file for complete search history.

(56) References Cited

U.S. PATENT DOCUMENTS

| 5,841,749 | A | * | 11/1998 | Sako | ........................ | 369/59.26 |
| 5,867,466 | A | * | 2/1999 | Igarashi et al. | .......... | 369/53.24 |
| 6,577,569 | B1 | * | 6/2003 | Yamamoto et al. | ...... | 369/47.18 |
| 6,904,008 | B2 | * | 6/2005 | Kawashima et al. | ..... | 369/47.15 |

* cited by examiner

*Primary Examiner*—Tan Dinh
*Assistant Examiner*—Kim-Kwok Chu
(74) *Attorney, Agent, or Firm*—Winston Hsu (57) ABSTRACT

An apparatus of detecting defects on an optical recording medium includes a defect signal generating circuit for generating a corresponding defect signal according to a surface defect of the optical recording medium, a first synchronous signal generator for generating a first synchronous signal, a defect signal locating circuit, a delay signal generating circuit, and an OR gate. The defect signal includes at least one pulse, whose width corresponds to the physical width of a surface defect. The delay signal generating circuit generates a delay signal corresponding to each pulse when the spacing between two adjacent pulses is smaller than a preset value. An OR operation is performed to the delay signal and the defect signal to obtain a defect extension signal. The first synchronous signal and a second synchronous signal for separating data recording sectors of the optical recording medium are employed to detect widths and addresses of surface defects.

14 Claims, 5 Drawing Sheets

APPARATUS AND METHOD OF DETECTING DEFECTS ON OPTICAL RECORDING MEDIA

FIELD OF THE INVENTION

The present invention relates to an apparatus and a method of detecting defects on an optical recording medium and, more particularly, to an defect detection apparatus and a method thereof, wherein a synchronous signal is utilized to calculate the width and address of surface defects on an optical recording medium, and a delay signal is added in to an optical medium recording device for the sake of reducing the firmware load when the gap between two adjacent surface defects is smaller than a preset value.

BACKGROUND OF THE INVENTION

The surface of a common optical recording medium (e.g., CD) or rewritable optical recording medium (e.g., CD-RW) may be scratched in use due to rubbing with other rough surfaces. Once these optical recording media have defects on the surfaces thereof for some reasons, such as scratching, optical media recording devices have to recognize in advance or during recording process at which address or in which sector the optical recording media have surface defects. Although data will still be recorded at addresses having these surface defects, these data will also be duplicated into another spare data area for the safety concern.

In order to know relative information of the width and address of surface defects, optical medium recording devices usually require incorporating with some other hardware. The same results can be acquired with a preset file system of the operating system. Compared with the former, the latter appears to be very complicated. On the other hand, compared with optical medium recording devices, common optical medium reading devices (e.g., CD-ROM) cannot solve the problem of surface defects of disk. Some well-known large companies like Compaq, Sony, Philips, and Microsoft constituted a Mt. Rainier group to advocate a standard of defect management into optical disc devices and operating systems so as to enhance their compatibility and surface defects managing function, thereby solving some unpredictable troubles possibly encountered when optical recording media have surface defects.

SUMMARY OF THE INVENTION

The primary object of the present invention is to provide an apparatus and a method of detecting defects on an optical recording medium. The width and address of surface defects on an optical recording medium can be successfully detected at the same time when data are going to be recorded into the optical recording medium. Data to be written to where these surface detects are located are thus duplicated into a spare data area for the purpose of successful reading afterwards.

Another object of the present invention is to input a delay signal to virtually lengthen the width of the surface defect when the gap between two adjacent surface defects is too small. Therefore, optical medium recording devices need not to perform the defect detection for every surface defect, thereby reducing the firmware load of deciding the defect positions.

To achieve the above objects, the present invention provides an apparatus of detecting defects on an optical recording medium. This apparatus comprises a defect signal generating circuit, a defect signal locating circuit, and a first synchronous signal generator. The defect signal generating circuit serves to generate a corresponding defect signal according to a surface defect—if exists—of the optical recording medium. The first synchronous signal generator serves to generate the first synchronous signal and sends the first synchronous signal to the defect signal locating circuit. The defect signal includes at least one pulse each corresponds to each single surface defect. The width of the pulse also corresponds to the physical width of the surface defect. Besides, the optical recording medium further includes a plurality of data recording sectors. Every adjacent two data recording sectors are separated by the second synchronous signal. The second synchronous signal is similarly inputted into the defect signal locating circuit, pairing with the first synchronous signal, for detecting the address and physical width of the surface defect in the data recording sectors. When the gap between two adjacent surface defects is smaller than a preset value, a delay signal generating circuit is also provided to generate a delay signal, which is performed an OR operation with the defect signal pulse. This is equivalent to extending the width of the surface defect. By this way, data supposed to be recorded into these data recording sectors covered by the enlarging surface defects are going to be duplicated into a spare data area, for the sake of safety. Under this configuration, it is not necessary for an optical medium recording device to detect the exact address and width of each surface defect, hence reducing the load of firmware operation. In other words, if the gap between two defects is less than a predetermined value, the proposed invention method is not going to detect every surface defect, but virtually to take these surface defects as a equivalently large surface defect with the input of the delay signal. Consequently, firmware of the recording device needs not to deal with these surface defects having gaps therebetween less than a predetermined value.

The present invention also provides a method of detecting surface defects on an optical recording medium. The method comprises the following steps of providing a defect signal generating circuit for generating a corresponding defect signal including at least one pulse whose width corresponds to a physical width of the surface defect for data recording sectors having at least a surface defect, (2) providing a defect signal locating circuit for inputting the defect signal so as to detect the address of the surface defect and the physical width of the surface defect, inputting a first synchronous signal to the defect signal locating circuit, inputting a second synchronous signal to the defect signal locating circuit, and detecting the address and the physical length of the surface defect through the first and the second synchronous signals. Every adjacent two data recording sectors are separated by the second synchronous signal. When the signal spacing of two adjacent pulses is smaller than a preset value, the present invention also includes another step of generating a delay signal and the pulse duration of the delay signal is larger than the signal spacing of the two adjacent pulses. An OR operation is performed to this delay signal and the defect signal pulses. The first synchronous signal serves as the unit for directly calculating how much the first synchronous signal the pulse duration has after being extended by a defect extension signal. After this calculation, the number of the first synchronous signal for the pulse duration of the delay signal is subtracted to obtain the physical width of the defect signal.

The various objects and advantages of the present invention will be more readily understood from the following detailed description when read in conjunction with the appended drawing, in which:

DETAILED DESCRIPTION OF THE PREFERRED EMBODIMENTS

Figure 1A:
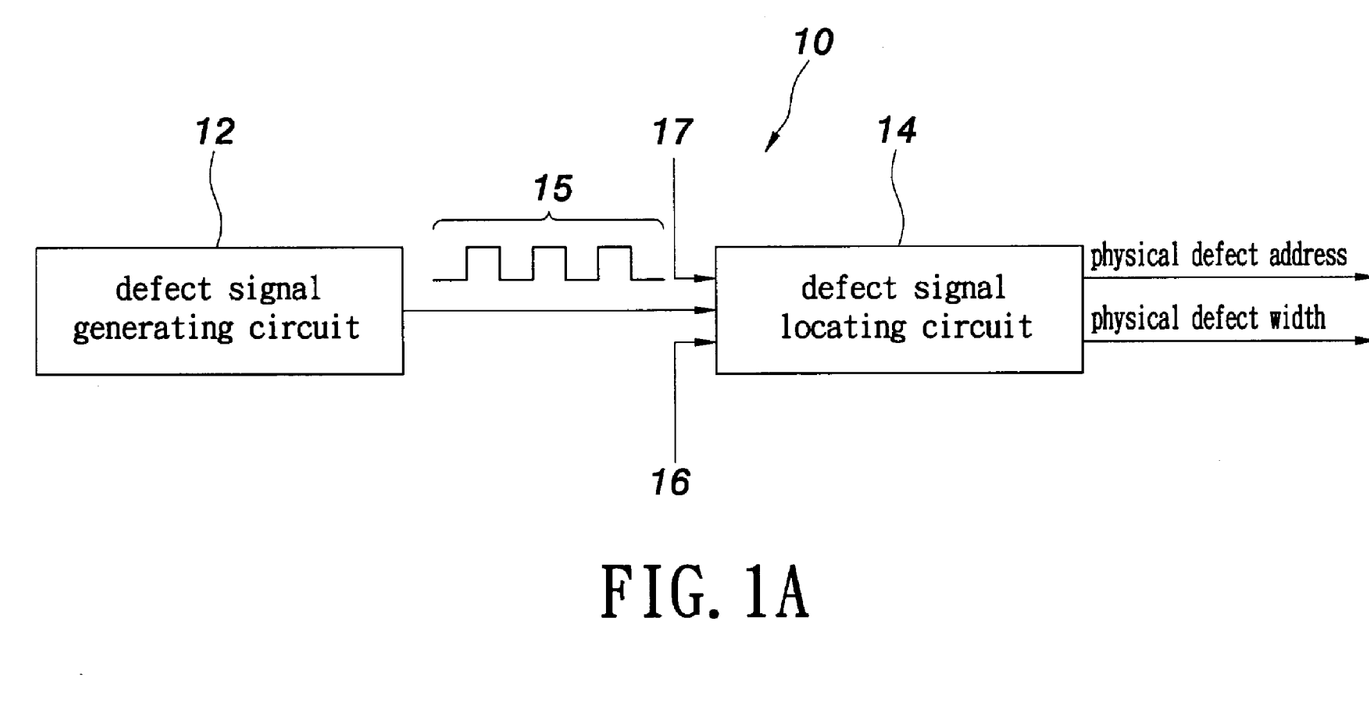
FIG. 1A is a block diagram of an apparatus of detecting surface defects on an optical recording medium of the present invention.
Figure 1B:
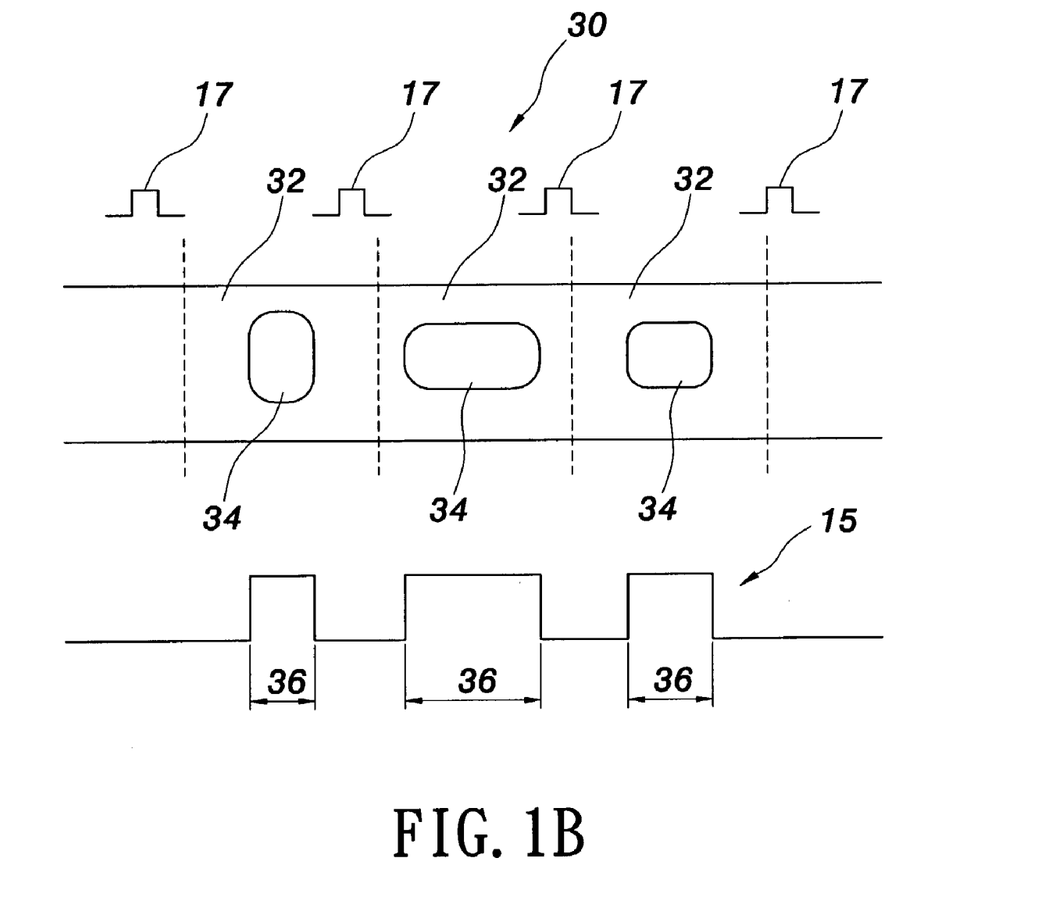
FIG. 1B is a diagram showing the defect signal in FIG. 1A.

As shown in FIG. 1A, a defect detection apparatus 10 comprises a defect signal generating circuit 12 and a defect signal locating circuit 14. The defect signal generating circuit 12 serves to generate a corresponding defect signal 15 according to at least one surface defect (not shown in FIG. 1A) of each data recording sector of an optical recording medium. The defect signal 15 includes at least one pulse, whose width corresponds to the physical width of the surface defect. This defect signal 15 along with a first synchronous signal 16, preferably an eight-to-fourteen modulation (EFM) frame signal, and a second synchronous signal 17, preferably an absolute time in pre-groove (ATIP) signal or a sub-code signal, will be inputted into the defect signal locating circuit 14 to obtain the address of this surface defect in the data recording sector and the physical width of this surface defect. Please further refer to FIG. 5B. An optical recording medium 30 includes a plurality of data recording sectors 32, which is represented by the area between two adjacent second synchronous signals 17. Each data recording sector 32 may include at least one surface defect 34. The defect signal 15 generated by the defect signal generating circuit 12 in FIG. 1A includes a plurality of pulses. Each of the pulses corresponds to one of the surface defects 34, and the pulse width thereof also corresponds to the physical width of the corresponding surface defect 34. That is, from the number of the pulses of the defect signal 15 and the pulse width of each signal pulse, the distribution and width of the defects of this optical recording medium can be known. Through calculation of the number of the first synchronous signal for each pulse duration, one can infer the corresponding physical width of the surface defect. The second synchronous signal serves to define the start location (or end location) of each data recording sector 32. The width and address of the surface defect of the optical recording medium can thus be known.

Figure 2A:
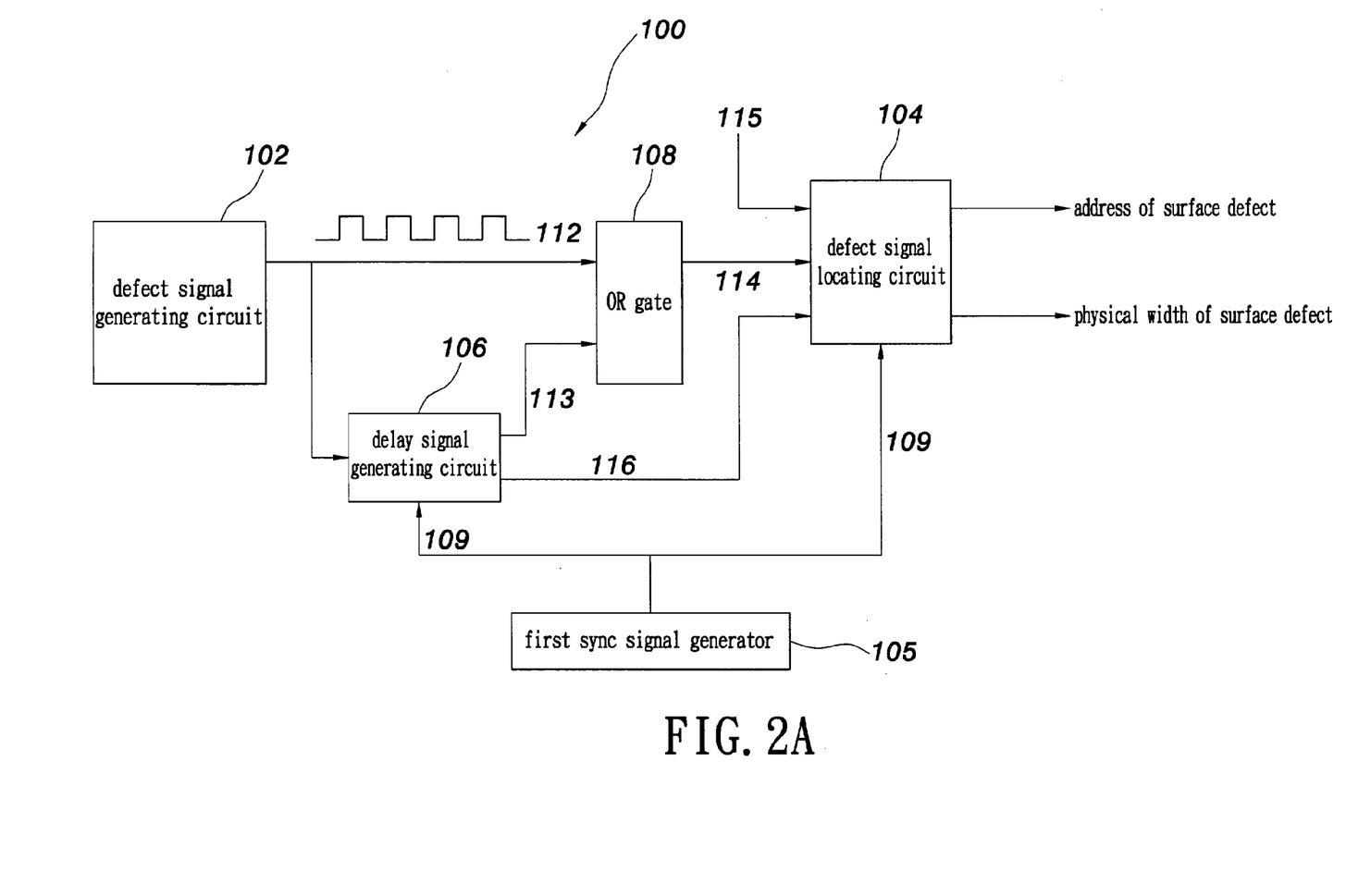
FIG. 2A is a block diagram of an apparatus of detecting surface defects on an optical recording medium according to another embodiment of the present invention.

As shown in FIG. 2A, a defect detection apparatus 100 comprises a defect signal generating circuit 102, a defect signal locating circuit 104, a first synchronous signal generator 105, a delay signal generating circuit 106, and an OR gate 108.

The defect signal generating circuit 102 serves to generate a defect signal 112 according to the surface defect of an optical recording medium. The defect signal 112 includes at least one pulse, whose width corresponds to the physical width of its corresponding surface defect. The first synchronous signal generator 105 serves to generate a first synchronous signal 109, which is sent to the defect signal locating circuit 104 and the delay signal generating circuit 106. The delay signal generating circuit 106 serves to generate a delay signal 113 corresponding to each pulse of the defect signal 112. The OR gate 108 serves to perform an OR operation to the defect signal 112 and the delay signal 113 so as to generate a defect extension signal 114. The defect extension signal 114 along with the first synchronous signal 109, preferably an EFM frame signal, and a second synchronous signal 115, preferably an ATIP signal or a sub-code signal, are inputted into the defect signal locating circuit 104 to detect the physical width and address of the surface defect. The optical recording medium comprises a plurality of data recording sectors, which are distinguished by the second synchronous signal 115. The first synchronous 105 is also inputted into the delay signal generating circuit 106 to calculate the number 116 of the first synchronous signal 109 the pulse duration of the delay signal 113 has. This number 116 will later be subtracted from the number of the first synchronous signal 108 the pulse duration of the defect extension signal 114 has, thereby obtaining the real physical width of the surface defect. Similar to FIGS. 1A and 1B, the first synchronous signal 109 serves to calculate the physical width of the surface defects, while the second synchronous signal 115 serves to calculate the address of these surface defects.

Figure 2B:
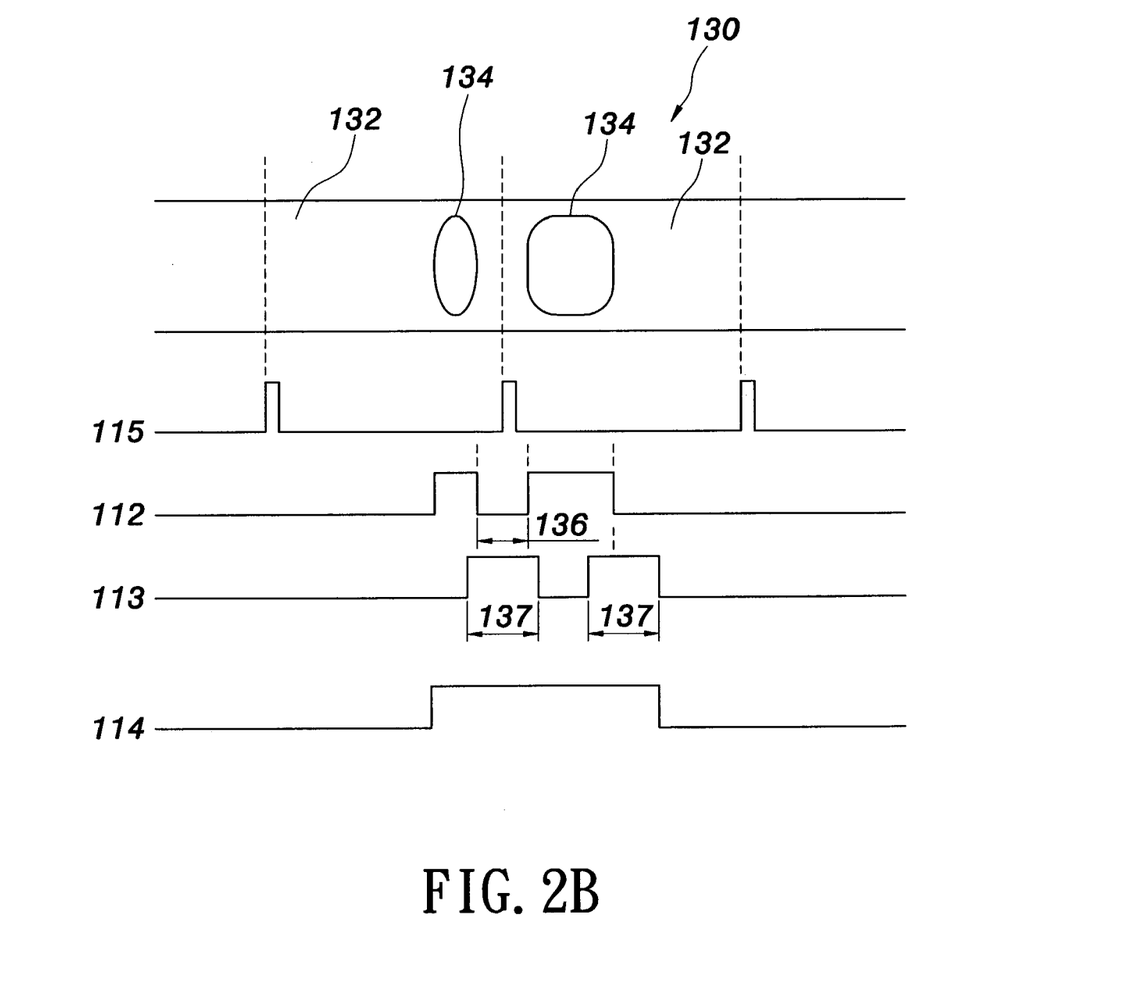
FIG. 2B is a diagram showing an optical recording medium, the defect signal, the delay signal, the defect extension signal, and the second synchronous signals in FIG. 2A.

Please refer to FIG. 2B, an optical recording medium 130 comprises a plurality of data recording sectors 132. Each of the data recording sectors 132 may include at least one surface defect 134, and every adjacent two of the data recording sectors 132 are virtually separated by the second sync signal 115. The defect signal 112 includes a plurality of pulses, which correspond to the surface defects 134. The width and signal spacing between adjacent pulses correspond to the physical width of the surface defect and the distance of two adjacent surface defects, respectively. The delay signal 113 is triggered at the falling edge of the pulse of the defect signal 112. The defect signal 112 and the delay signal 113 are similarly inputted into the OR gate 108 of FIG. 2A to generate the defect extension signal 114.

When the gap between two adjacent surface defects 134 (i.e., the signal spacing 136 between two defect signals 112) is small than a preset value, in order to reduce the firmware load of an optical medium recording device, the delay signal 113 is incorporated, so that the optical medium recording device needs not to detect the physical width and address of each surface defect 134. Preferably, when the signal spacing 136 between two adjacent defect signals 112 is smaller than 10 times of the length of a single EFM frame signal, the optical medium recording device will select not to process these surface defects 134. Instead, a delay signal 113 is added in, and an OR operation is performed to this delay signal 113 and the defect signal 112 to obtain a defect extension signal 114. The pulse duration 137 of this delay signal 113 is larger than the signal spacing 136 of the defect signals 112. The pulse duration 137 of this delay signal 113 preferably is 108 times of the length of a single EFM frame signal. It should be noted that the relationship between the width of the pulse duration 137 and the width of the signal spacing 136 in FIG. 2B is not drawn proportionally. By inputting the first synchronous signal 109 and the second synchronous signal 115 to the defect signal locating circuit 104 of FIG. 2A, the number 116 of the first synchronous signal 109 the pulse duration of the defect extension signal 114 has can be figured out. The calculation result will be subtracted by the number of the first synchronous signal 109 the pulse duration 137 of the delay signal 113 has, thereby obtaining the exact width of the surface defects.

Because data are stored on an optical recording medium in a scattered fashion, when some data recording sector has many surface defects, erroneous reading may occur during data reading. In order to avoid overload of firmware of an optical medium recording device, some surface defects will not be detected when the distances between these surface defects are too small. Instead, according to the surface defects, a delay signal will be used to generate a defect extension signal and the width and address of the defect extension signal will be detected. Next, the number of the first synchronous signals the pulse duration of the delay signal has is subtracted from the number of the first synchronous signals the pulse duration of the defect extension signal has, so as to obtain the width and address of the surface defects.

Figure 3:
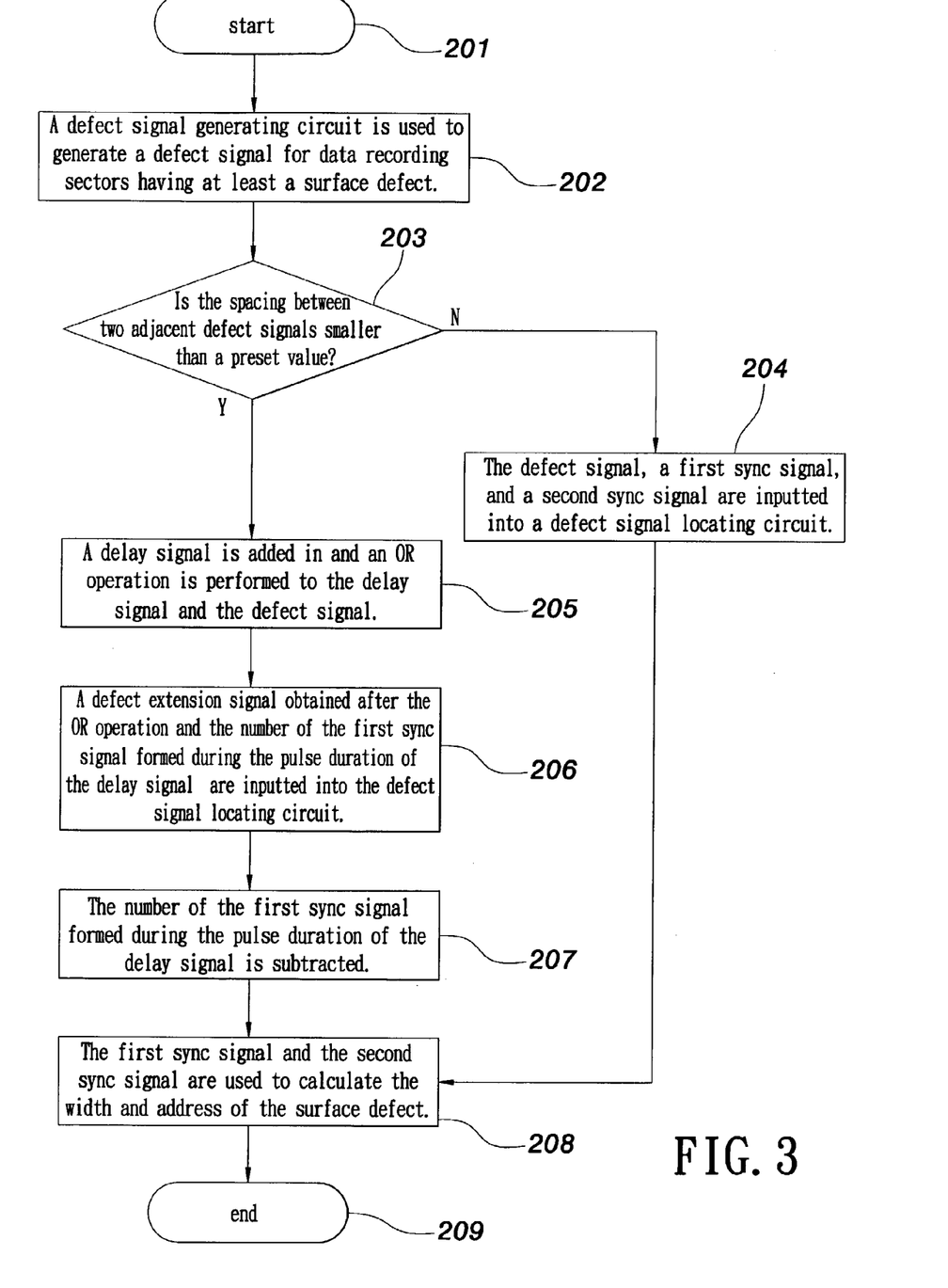
FIG. 3 is a flowchart of a method of detecting surface defects on an optical recording medium.

As shown in FIG. 3, a method of detecting defects on an optical recording medium of the present invention comprises the following steps of:

Step 201: start;

Step 202: providing a defect signal generating circuit to generate a defect signal including at least one pulse, whose width corresponds to the physical width of the surface defect, for data recording sectors having at least one surface defect;

Step 203: determining if the spacing between two adjacent defect signals smaller than a preset value? Jump to Step 204 if negative; otherwise, jump to Step 205;

Step 204: inputting the defect signal along with a first synchronous signal and a second synchronous signal to a defect signal locating circuit, then jumping to Step 208;

Step 205: inputting a delay signal and performing an OR operation for the delay signal and the defect signal;

Step 206: obtaining a defect extension signal after the OR operation and inputting the number of the first synchronous signal the pulse duration of the delay signal has to the defect signal locating circuit;

Step 207: subtracting the number of the first synchronous signal the pulse duration of the delay signals has from the first synchronous signal number of the defect extension signal;

Step 208: calculating the width and address of the surface defects through the first second synchronous signals; and Step 209: end.

The method of detecting surface defects on an optical recording medium of the present invention comprises a step of determining whether the gap between two adjacent surface defects (i.e., the signal spacing between defect signal pulses). When the signal spacing between defect signal pulses is smaller than a preset value (e.g., 10 times the length of a single EFM frame signal), a delay signal is added in. An OR operation is performed to this delay signal and the defect signal, as described in Step 205, to obtain a defect extension signal. The number of the first synchronous signals the pulse duration of the delay signal has will be subtracted from the number of the first synchronous signals the pulse duration of the defect extension signal has to calculate the physical width and address of the surface defects. Therefore, when the adjacent two surface defects are too close, it is not necessary for an optical medium recording device adopting the method of the present invention to detect the physical width and address of each surface defect, thereby reducing firmware load of the optical medium recording device. After a delay signal is added to generate the defect extension signal, when recording data into sectors corresponding to this defect extension signal, these data will also be duplicated into a spare data area for the sake of successful reading. Because each surface defect of an optical recording medium corresponds to a pulse of the defect signal and the widths of the pulses may differ (corresponding to different physical widths of the surface defects), the physical widths and addresses of the surface defects can be calculated when the first synchronous signal and the second synchronous signal are used to calculate the defect signal or the delay signal-subtracted defect extension signal, thereby obtaining the physical width and address of the surface defects.

As compared to the prior art, in the method of detecting surface defects on an optical recording medium of the present invention, an OR operation is performed to the original defect signal and a delay signal when the gap between two adjacent surface defects is smaller than a preset value, hence generating a defect extension signal. This defect extension signal may last more than one data recording sector. Data to be recorded into the data recording sectors corresponding to the defect extension signals will also be duplicated into a spare data area for the purpose of successfully data reading. When the gap between two adjacent surface defects is too small, the method of the present invention will not calculate the physical width and location of each surface defect. Instead, an OR operation is performed to produce a defect extension signal and the number of counter clocks the pulse duration of the delay signal has is then subtracted, thereby obtaining the physical widths and addresses of the surface defects. Moreover, the method of the present invention can reduce load of firmware of an optical medium recording device.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. An apparatus of detecting defects on an optical recording medium, comprising:
   a defect signal generating circuit for generating a corresponding defect signal according to at least one surface defect of an optical recording medium, said defect signal including at least one pulse, whose width corresponds to a physical width of said surface defect;
   a defect signal locating circuit;
   a first synchronous signal generator for generating a first synchronous signal, said first synchronous signal being inputted to said defect signal locating circuit; and
   a delay signal generating circuit for generating a delay signal according to each said pulse of said defect signal;
   wherein the pulse duration of said delay signal is larger than a signal spacing between adjacent two of said pulses, and said optical recording medium comprises a plurality of data recording sectors, every adjacent two of said data recording sectors are separated by a second synchronous signal, and said second synchronous signal is inputted into said defect signal locating circuit to incorporate with said first synchronous signal for determining an address of said surface defect in said data recording sectors and the physical width of said surface defect.

2. An apparatus of detecting defects on an optical recording medium, comprising:
   a defect signal generating circuit for generating a corresponding defect signal according to at least one surface defect of an optical recording medium, said defect signal including at least one pulse, whose width corresponds to a physical width of said surface defect;
a defect signal locating circuit;
a first synchronous signal generator for generating a first synchronous signal, said first synchronous signal being inputted to said defect signal locating circuit; and
a delay signal generating circuit for generating a delay signal according to each said pulse of said defect signal;
wherein said optical recording medium comprises a plurality of data recording sectors, every adjacent two of said data recording sectors are separated by a second synchronous signal, and said second synchronous signal is inputted into said defect signal locating circuit to incorporate with said first synchronous signal for determining an address of said surface defect in said data recording sectors and the physical width of said surface defect, and said delay signal is subtracted when said defect signal locating circuit detects the address and the physical length of said defect signal.

3. An apparatus of detecting defects on an optical recording medium, comprising:
a defect signal generating circuit for generating a corresponding defect signal according to at least one surface defect of an optical recording medium, said defect signal including at least one pulse, whose width corresponds to a physical width of said surface defect;
a defect signal locating circuit;
a first synchronous signal generator for generating a first synchronous signal, said first synchronous signal being inputted to said defect signal locating circuit;
a delay signal generating circuit for generating a delay signal according to each said pulse of said defect signal; and
an OR gate for performing an OR operation to said defect signal and said delay signal;
wherein said optical recording medium comprises a plurality of data recording sectors, every adjacent two of said data recording sectors are separated by a second synchronous signal, and said second synchronous signal is inputted into said defect signal locating circuit to incorporate with said first synchronous signal for determining an address of said surface defect in said data recording sectors and the physical width of said surface defect.

4. An apparatus of detecting defects on an optical recording medium, comprising:
a defect signal generating circuit for generating a corresponding defect signal according to at least one surface defect of optical recording medium, said defect signal including at least one pulse, whose width corresponds to a physical width of said surface defect;
a defect signal locating circuit;
a first synchronous signal generator for generating a first synchronous signal, said first synchronous signal being inputted to said defect signal locating circuit; and
a delay signal generating circuit for generating a delay signal according to each said pulse of said defect signal;
wherein said delay signal is triggered at a falling edge of said pulse, and said optical recording medium comprises a plurality of data recording sectors, every adjacent two of said data recording sectors are separated by a second synchronous signal, and said second synchronous signal is inputted into said defect signal locating circuit to incorporate with said first synchronous signal for determining an address of said surface defect in said data recording sectors and the physical width of said surface.

5. An apparatus of detecting defects on an optical recording medium, comprising:
a defect signal generating circuit for generating at least one corresponding defect signal according to at least one surface defect of an optical recording medium, said defect signal including at least one pulse, whose width corresponds to a physical width of said surface defect;
a defect signal locating circuit;
a first synchronous signal generator for generating a first synchronous signal, said first synchronous signal being inputted to said defect signal locating circuit;
a delay signal generating circuit for generating a delay signal corresponding to each said pulse; and
an OR gate for performing an OR operation to said defect signal and said delay signal;
wherein said optical recording medium comprises a plurality of data recording sectors, every adjacent two of said data recording sectors are separated by a second synchronous signal, and said second synchronous signal is inputted to said defect signal locating circuit to incorporate with said first synchronous signal for determining an address of said surface defect in said data recording sectors and the physical width of said surface defect.

6. The apparatus of detecting defects on an optical recording medium as claimed in claim 5, wherein said first synchronous signal is an eight-to-fourteen modulation (EFM) frame signal.

7. The apparatus of detecting defects on an optical recording medium as claimed in claim 5, wherein said second synchronous signal is a sub-code signal.

8. The apparatus of detecting defects on an optical recording medium as claimed in claim 5, wherein said second synchronous signal is an absolute time in pre-groove (ATIP) signal.

9. The apparatus of detecting defects on an optical recording medium as claimed in claim 5, wherein the pulse duration of said delay signal is larger than a signal spacing between adjacent two of said pulses.

10. The apparatus of detecting defects on an optical recording medium as claimed in claim 5, wherein said delay signal is subtracted when said defect signal locating circuit detects the address and the physical width of said defect signal.

11. The apparatus of detecting defects on an optical recording medium as claimed in claim 5, wherein said delay signal is triggered at a falling edge of said pulse.

12. A method of detecting surface defects on an optical recording medium having a plurality of data recording sectors, said method comprising the steps of:
(a) using a defect signal generating circuit to generate a defect signal for said data recording sectors having at least one surface defect, said defect signal including at least one pulse, whose width corresponds to a physical width of said surface defect;
(b) inputting said defect signal into a defect signal locating circuit, said defect signal locating circuit serving to determine an address of said surface defect in said data recording sectors and the physical width of said surface defect;
(c) inputting a first synchronous signal into said defect signal locating circuit;
(d) inputting a second synchronous signal into said defect signal locating circuit;

(e) using said first synchronous signal and said second synchronous signal to calculate the address and physical width of said surface defect; and (f) generating a delay signal whose pulse duration is larger than a signal spacing of adjacent two of said pulses; wherein every adjacent two of said data recording sectors are separated by said second synchronous signal.

13. The method of detecting surface defects on an optical recording medium as claimed in claim 12 further comprises a step (g) of performing an OR operation to said defect signal and said delay signal to obtain a defect extension signal, calculating the number of said first synchronous signal the pulse duration of said defect extension signal has, and then subtracting the number of said first synchronous signal the pulse duration of said delay signal has so as to obtain the physical width of said defect signal.

14. The method of determining surface defects on an optical recording medium as claimed in claim 12, wherein said delay signal mentioned in said step (f) is triggered at a falling edge of said pulse.

* * * * *